United States Patent
Bennett

(10) Patent No.: US 9,662,843 B2
(45) Date of Patent: May 30, 2017

(54) TOOL AND METHOD FOR THE MANUFACTURE OF COMPOSITE STRUCTURES

(75) Inventor: Clive Bennett, Derbyshire (GB)

(73) Assignee: CYTEC INDUSTRIAL MATERIALS (DERBY) LIMITED, Derbyshire (GB)

( * ) Notice: Subject to any disclaimer, the term of this patent is extended or adjusted under 35 U.S.C. 154(b) by 848 days.

(21) Appl. No.: 12/997,403

(22) PCT Filed: May 29, 2009

(86) PCT No.: PCT/GB2009/001344
§ 371 (c)(1),
(2), (4) Date: Mar. 8, 2011

(87) PCT Pub. No.: WO2009/150401
PCT Pub. Date: Dec. 17, 2009

(65) Prior Publication Data
US 2012/0112377 A1   May 10, 2012

(30) Foreign Application Priority Data

Jun. 13, 2008   (GB) .................................. 0810870.6

(51) Int. Cl.
B29C 70/44 (2006.01)
B29C 70/54 (2006.01)
(Continued)

(52) U.S. Cl.
CPC ............ B29C 70/54 (2013.01); B29C 33/485 (2013.01); B29C 70/32 (2013.01); B29C 70/323 (2013.01);
(Continued)

(58) Field of Classification Search
CPC ......... B29C 70/30; B29C 70/32; B29C 70/34; B29C 33/485; B29C 33/48
(Continued)

(56) References Cited

U.S. PATENT DOCUMENTS 2,381,395 A   8/1945   Brown et. al.
3,788,916 A   1/1974   Gadelius
(Continued)

FOREIGN PATENT DOCUMENTS

EP   1375111        1/2004
EP   1767325 A2     3/2007
(Continued)

OTHER PUBLICATIONS

International Search Report and Written Opinion of corresponding PCT/GB2009/001344.
(Continued)

*Primary Examiner* — Christina Johnson
*Assistant Examiner* — Xue Liu
(74) *Attorney, Agent, or Firm* — Thi Dang

(57) ABSTRACT

A tool comprising a support section, a plurality of tool sections beatable around the core section to define one or more tool surfaces on which structure material is beatable to be molded to form a composite structure, the support section and enclosure means being sealingly engagable to enclose the tool sections and structure material therebetween, thus allowing air to be withdrawn from between the enclosure means and the support section as part of the cure process of the structure material. Sealing the enclosure means directly against the support section obviates the need for the tool sections to be sealingly interconnected.

7 Claims, 8 Drawing Sheets

(51) Int. Cl.
   *B29C 33/48*    (2006.01)
   *B29C 70/32*    (2006.01)
   *B29C 70/34*    (2006.01)
   *B29C 70/38*    (2006.01)
   *B29L 31/30*    (2006.01)

(52) U.S. Cl.
   CPC ............ *B29C 70/342* (2013.01); *B29C 70/38* (2013.01); *B29L 2031/3082* (2013.01)

(58) Field of Classification Search
   USPC ........................................................ 425/388
   See application file for complete search history.

(56) References Cited

U.S. PATENT DOCUMENTS

| | | | |
|---|---|---|---|
| 4,448,624 A * | 5/1984 | Webber | B29C 53/824 156/175 |
| 4,448,628 A | 5/1984 | Stott | |
| 4,693,678 A | 9/1987 | Von Volki | |
| 5,022,845 A * | 6/1991 | Charlson | B29C 33/30 156/425 |
| 5,266,137 A * | 11/1993 | Hollingsworth | 156/156 |
| 6,406,580 B1 * | 6/2002 | Campbell, Jr. | 156/182 |
| 2001/0040317 A1 | 11/2001 | Shiraishi et al. | |
| 2002/0149134 A1 | 10/2002 | Hemphill et al. | |
| 2006/0108058 A1 | 5/2006 | Chapman et al. | |

FOREIGN PATENT DOCUMENTS

| | | |
|---|---|---|
| GB | 1205120 | 9/1970 |
| WO | 041938 A1 | 5/2003 |
| WO | 2007148301 | 12/2007 |
| WO | 2008/049975 A1 | 5/2008 |
| WO | 2009/057023 A2 | 5/2009 |

OTHER PUBLICATIONS

Search Report issued Sep. 18, 2009 in corresponding United Kingdom Patent Application No. GB0909220.6.
Examination Report dated Mar. 14, 2012 from corresponding United Kingdom Patent Application No. GB0909220.6.

* cited by examiner

TOOL AND METHOD FOR THE MANUFACTURE OF COMPOSITE STRUCTURES

The present invention relates to tooling and particularly, but not exclusively to tooling for use in the manufacture of composite structures.

Composite structures, including composites articles and components, are increasingly finding application in many industries due primarily to their inherent strength, relatively light weight and resistance to corrosion. Composite structures are generally manufactured using reinforcing fibres, such as fibres of carbon, glass and aramid embedded in a resinous matrix. There are many different types of reinforcing fibres and resinous matrix materials available and known to those skilled in the art. The combination of reinforcing fibres, matrix resin and any other additives are selected by those skilled in the art according to the desired characteristics and properties for the composite materials and the structure to be made therefrom.

In general, to form composite structures from such composite materials, the composite materials are located, usually in a plurality of layers, on the surface of a tool or mould. The materials are compliant and conform to the shape of the tool surface with the resinous matrix material in an uncured condition. Once the requisite amount of material has been located on the tool, the material is subjected to conditions to cure, or at least part cure, the resinous matrix.

In many instances, for example where a plurality of layers of material are to be moulded, non-ambient pressure conditions such as vacuum conditions are required to be applied to the material on the tool, either in autoclave or non-autoclave conditions, to facilitate consolidation of the material and removal of air from within the material during cure.

The configuration and geometry of the tool and structure being moulded can be such that following cure the structure cannot be simply lifted from the tool. In such cases, collapsible tools are employed to enable release of the structure.

For example, where the structure has generally hollow, three-dimensional configuration, whether as a simple cylinder or a more complex geometry, the tool on which it is formed is generally located within the structure and needs to be collapsed to enable it to be removed. Collapsible tools generally comprise a plurality of interconnecting parts that can be selectively disassembled to enable the tool to be dismantled to a condition in which the tool and the moulded structure can be parted. To enable vacuum conditions to be applied to such tools, the tool parts need to interconnect with airtight seals.

Modern aircraft fuselages can be manufactured using fibre-reinforced composite materials. Manufacturing aircraft fuselages from such materials provides structures of significantly reduced weight, improved strength and improved corrosion resistance compared to conventional metallic aircraft structures.

The tools used in the manufacture of aircraft fuselages are generally in the form of a mandrel made up of a plurality of parts that can be sealingly secured together in an airtight manner to form a tool surface. Sealing the parts of such extremely large and heavy tools is very difficult. It involves a complex system of seals between each part. In addition, the weight of the tools and the sheer size (for example six and a half metres in diameter, twenty metres long and weighing approximately ninety tonnes is not uncommon) creates considerable stresses on the seals, that can lead to seal failure.

Such stresses can be further increased by certain methodologies of applying the composite material to such mandrels, which often involves winding the composite material around the mandrel using robotic positioning apparatus. This generally involves rotation of the mandrel. Ensuring accurate application of the composite material to such large and heavy structures is extremely difficult and with the need to ensure vacuum integrity of the tool during the cure process, this means that the manufacture of such tools and composite structures thereof is very intricate, difficult and expensive.

According to the present invention there is provided a tool for use in the manufacture of composite structures, the tool comprising a support section, a plurality of tool sections locatable around the support section to define one or more tool surfaces on which structure material is locatable to be moulded, and enclosure means being sealingly engagable on the support section to enclose the tool sections and structure material thereon between the enclosure means and the support section.

The support section and enclosure means may engage to form a substantially air tight seal therebetween, but preferably engage to form a completely airtight seal The tool sections may be located around the outside of the support section.

Preferably the support section is shaped to be selectively removable from location with the tool sections. The support section may be generally tapered to enable the support section to be selectively retracted from within the tool sections.

Alternatively the tool sections may be located around the inside of the support section.

In a still further alternative some of the tool sections may be located around the outside and others around the inside of the support section.

Preferably the tool sections are arranged around the support section in a configuration that is self-supporting when the support section is removed from supporting the tool sections. The tool sections may be arranged, for example in series, around the support section, adjacent sections abutting one another around the support section, preferably to encircle the support section, externally, internally or both.

Tool sections located around the outside of the support section preferably define tool surface(s) on the outer surface(s) thereof, on which structure material to be moulded can be placed an formed.

Tool sections located around the inside of the support section preferably define tool surface(s) on the inner surface(s) thereof, on which structure material to be moulded can be placed and formed.

The tool sections may comprise fibre-reinforced composite materials. The support section may comprise fibre-reinforced composite material.

Seal means may be provided to seal the support section and the enclosure means in engagement together. The seal means may comprise sealant, adhesive tape.

The support section may provide sealing means, such as one or more sealing surfaces remote from the tool sections on which the enclosure means can sealingly locate to substantially enclose the tool sections and material thereon, between the enclosure means and the support section.

The enclosure means may comprise an impermeable membrane or sheath, which may be of plastic, elastomeric or the suitable material Retaining means may be provided to selectively retain the tool sections in place around the support section. The retaining means may comprise straps or bands engagable around the tool sections. Alternatively, or in addition, the tool sections may be held together by retaining means extending between adjacent tool sections, between tool sections and the support section, or both, such as threaded fasteners, bolts, clamps and such like. As a still further alternative or addition the tool sections may be retained in position on the support section by vacuum or partial vacuum conditions applied between the tool sections and the support section.

According to a second aspect of the present invention there is provided a method of moulding a composite structure comprising locating a plurality of tool sections around a support section to define one or more tool surfaces on which a structure can be formed, locating material to be moulded on the said tool surface(s), and sealingly enclosing the material and the tool sections between an enclosure means and the support section.

The method preferably involves the use of a tool as described in any of paragraphs ten to twenty-two above.

Preferably the enclosure means seals against the support section to provide a substantially airtight seal.

Preferably means is provided to withdraw air from between the support section and the enclosure means during cure of the material under cure conditions to facilitate consolidation of the material and withdrawal of air from therewithin, during cure.

The tool may be rotated to wind the material to be moulded over the tool surface(s).

Alternatively or in addition the material may be laid by hand or otherwise on the tool surface(s) according to known techniques.

According to a third aspect of the present invention there is provided a support section substantially as described above.

Accordingly to a fourth aspect of the present invention there is provided a plurality of tool sections substantially as described above.

Preferred embodiments of the present invention will now be described by way of example only, with reference to the accompanying drawings, in which.

Figure 1:
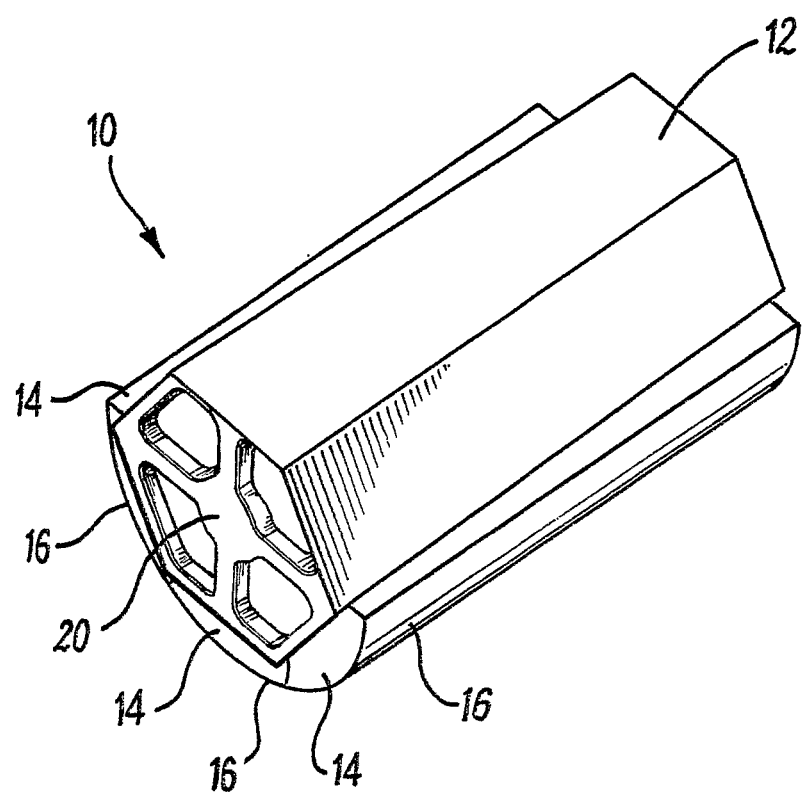
FIG. 1 is a partial perspective view of a partially assembled tool according to one embodiment of the present invention.

The invention provides tools for use in the manufacture of composite structures and methodology for the manufacture of composite structures using such tools.

With reference to the drawings, according to one embodiment of the invention the tool 10 comprises a support section 12, a plurality of tool sections 14 locatable around the core section 12 to define one or more tool surfaces 16 on which structure material C is locatable to be moulded to form a composite structure, the support section 12 and enclosure means 18 being sealingly engagable to enclose the tool sections 14 and structure material C therebetween.

In more detail the support section 12 of the tool 10 is shown as a generally hollow, elongate body having a generally hexagonal cross-section that defines six outer surfaces on which six tool sections 14 are locatable. In FIG. 1, the upper three tool sections are removed for clarity of illustration. The support section 12 has web formations 20 across each end to strengthen the structure and to provide support for means to rotate the tool 10 during the (not shown) at intervals along the length of the support section may be provided.

This embodiment of the invention can be referred to as a male tool, with material moulded thereon being located externally of the tool sections and the tool surfaces defined thereby.

Figure 2:
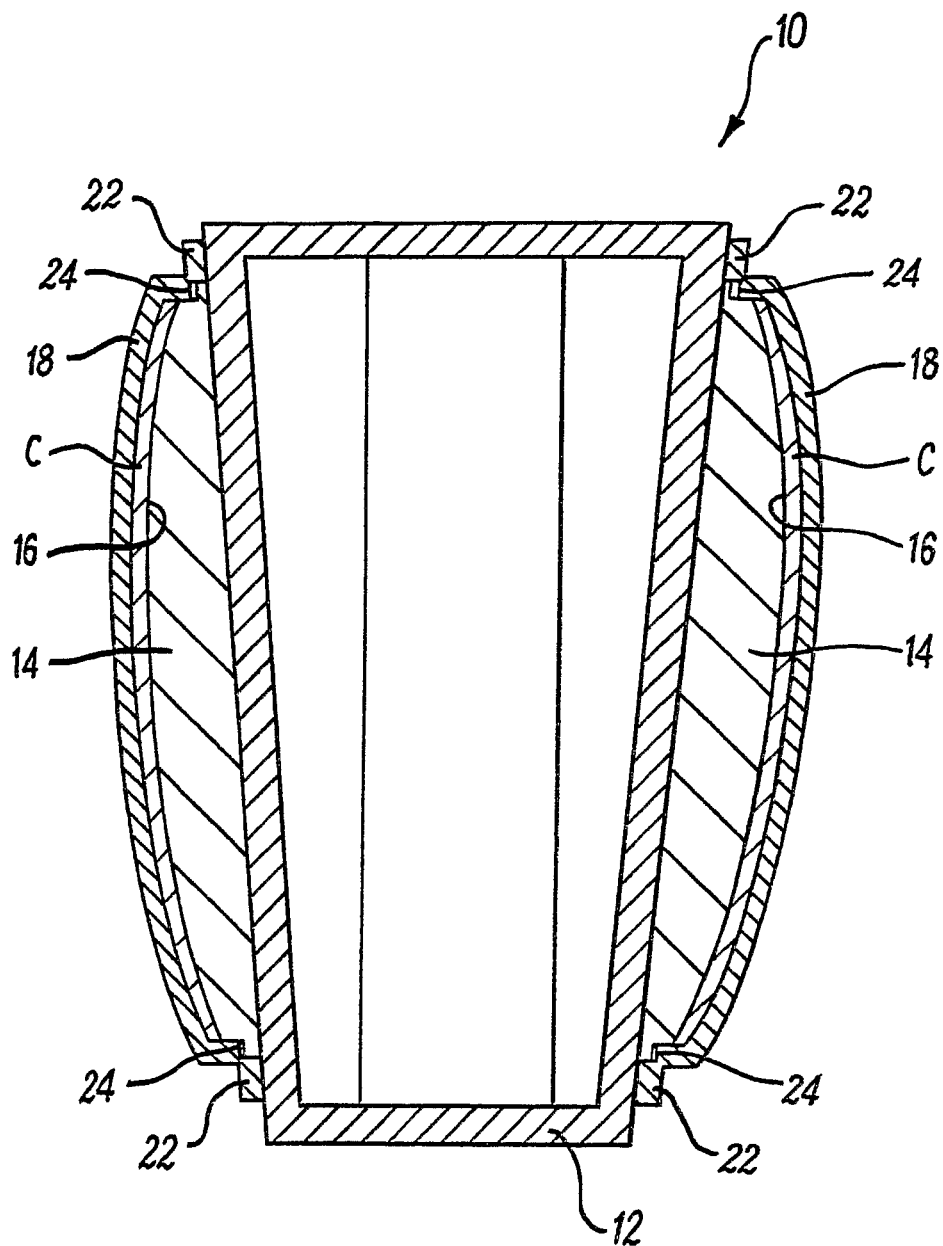
FIG. 2 is a cross-section of the tool of FIG. 1 with structure material laid thereon and enclosed beneath enclosure means.

An important feature of the support section 12 is that it is shaped to be selectively removable from within the support sections 16 when located thereon for use. This is generally enabled by the core section 12 having a tapered configuration from one end thereof to the other. This is clearly illustrated in FIG. 2.

The support section 12 is preferably comprised of composite material such as fibre-reinforced resinous composite material and desirably of a similar composite material to that of the tool sections 14 and also the material to be moulded thereon. This provides for identity or similarities in characteristics such as thermal expansion coefficients, to help minimise any distortion between the various components during cure.

The tool sections 14 are locatable in series around the exterior of the support section 12 such that consecutive tool sections 14 abut one another and between them define the tool surface 16 on which a composite structure can be formed.

As indicated above, the tool sections are generally comprised of composite material, such as fibre-reinforced resinous composite material.

The tool sections 16 do not extend over the whole length of the support section 12 such that sealing surfaces 22 are provided around the support section 12 generally at each end of the core section 12.

It is an important feature of the present invention that enclosure means 18 can be sealed against the support section 12. The enclosure means 18 may seal, as illustrated in the present embodiment, by engagement on an external surface or surfaces of the support section 12. Alternatively or in addition the enclosure means could for example engage on the end surfaces or on an inner surface of the support section 2, thus enabling the tool sections 14 to extend along the full length of the support 12 section.

Figure 10:
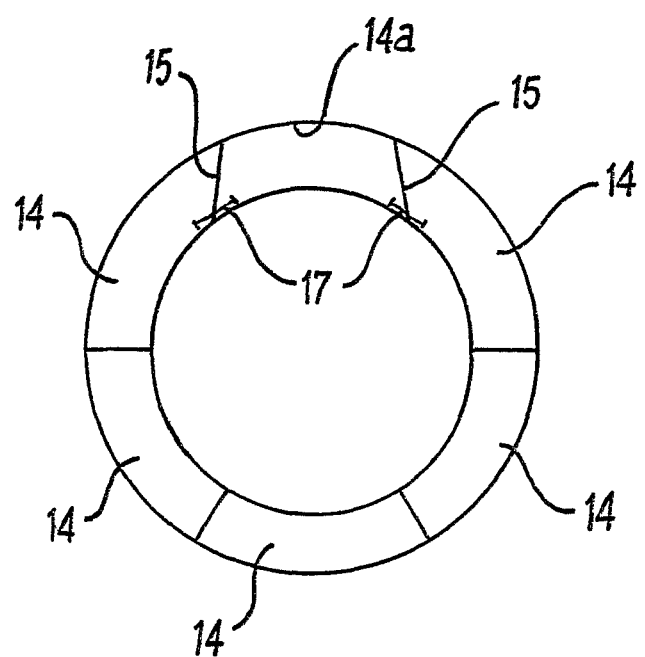
FIG. 10 is an end view of a tool section assembly illustrating one embodiment of a keying section.

The tool sections 14 of this embodiment are configured such that they are self-supporting to the extent that they will of inwardly collapse upon withdrawal of the core section 12 from therebetween. The abutting sides of the tool sections 14 are generally angled to prevent inward collapse (FIG. 10). However, it can be important to be able to selectively collapse the tool sections 14 inwardly to enable parting of a moulded structure from the tool and one way that this is achieved Is by providing for a keying section (which may be one of the tool sections) which is configured to allow selective inward withdrawal thereof and subsequent inward collapse of the tool sections. FIG. 10 shows one such configuration, where one of the tool sections 14a has sides that are angled to enable it to be inwardly withdrawn from the assembly of tool sections 14 when the support section is removed. Securing means, such as threaded fasteners like bolts 1, may be used to extend between the section 14a and the adjacent sections 14 to retain the section 14a in place until the securing means 17 is selectively removed.

Securing bands or straps 24 (see FIGS. 1-5) may be located around the tool sections 14 to help hold them together on the support section 12 and to prevent movement away from the support section 12. The bands 24 are at locations away from the tool surface on which the material is to be moulded.

The enclosure means 18 is in the form of a flexible, substantially non-permeable membrane, such as a membrane or sheath of elastomeric or other plastics material. This can be sealed to form an air tight seal against the sealing surfaces 22 using techniques known to those skilled in the art and as will be discussed later.

The sealing of the enclosure means 18 directly on to the support section 12 gives the tool significant advantage over conventional collapsible tools. It obviates the need for the tool sections 14 to be sealingly located against one another and thus obviates the need for complex and expensive sealing systems to be employed between the tool sections.

This perhaps find particular advantage in tools for the formation of large composite structures such as aeroplane fuselages where the problems of sealing between the tool sections of conventional systems provide considerable difficulties.

Further, the support section 12 provides support from within the tool structure to the tool sections 14, thus providing a tool that is generally rigid and not prone to the distortions that are generally experienced with known collapsible mandrels, particularly through rotation thereof during the manufacture of composites thereon.

It is preferable that the support section 12 comprises a unitary body. A key feature of the support section 12 is that it provides a body against which an enclosure means can seal in a generally airtight manner in a simple and effective manner and for the space defined between the enclosure means 18 and the support section 12 to be essentially airtight to enable selective control of the pressure therebetween and thus on composite material located therein. Keeping the support section 12 as a unitary structure facilitates this and obviates the need for any sealing to be provide in the support section 12 itself. However, where it is necessary for support sections 12 to be manufactured of a number of components, appropriate seals can be relatively easily provided.

In use the tool 10 of the present invention is used in the manufacture of composite structures, including composite articles and composite components, generally where the configuration of the component is such that it is necessary for the tool to be collapsed to remove the component from the tool. The tool can be used to mould any moulding material, but is particularly useful in moulding materials such as fibre reinforced resinous composite material that benefit from non-ambient pressure cure conditions during moulding.

One particular application is in the manufacture of aeroplane fuselages from fibre-reinforced composite materials. The tool 10 of the present invention is particularly suited for the manufacture of such large structures.

Figure 3:
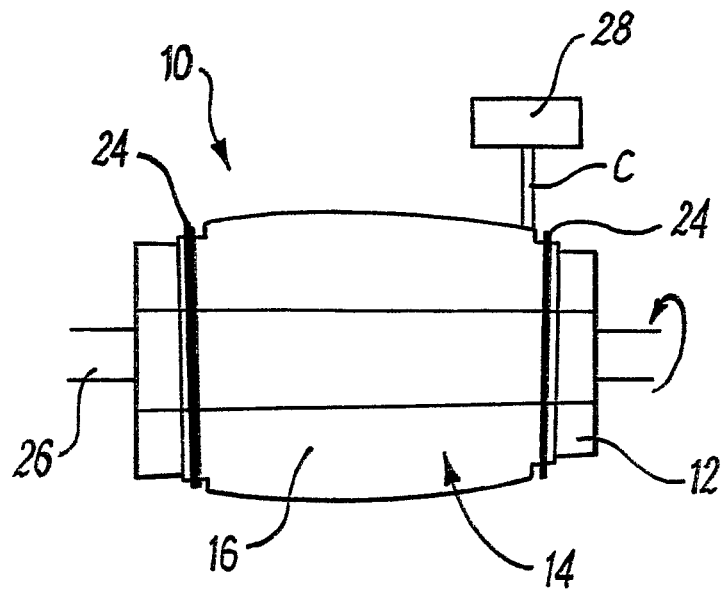
FIG. 3 is a side view of the tool of FIG. 2 in position for the location of structure material thereto.
Figure 4:
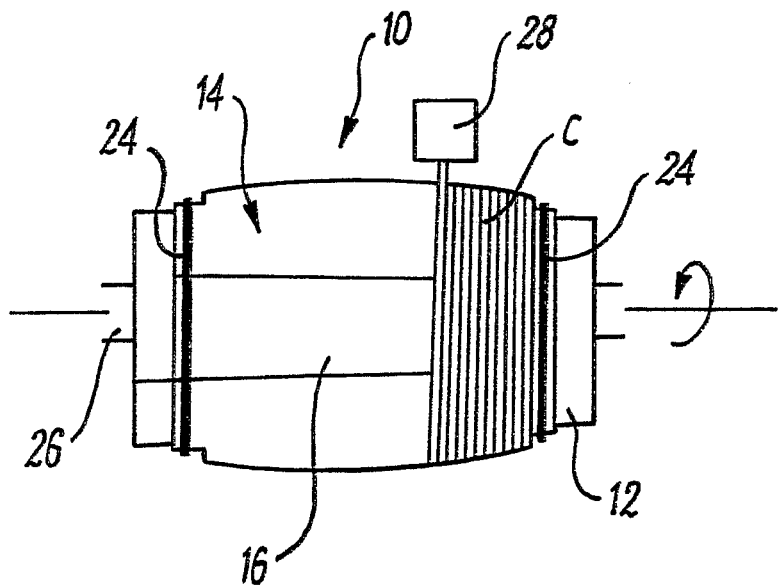
FIG. 4 shows the tool of FIG. 3 part way through the process of the application of structure material thereto.
Figure 5:
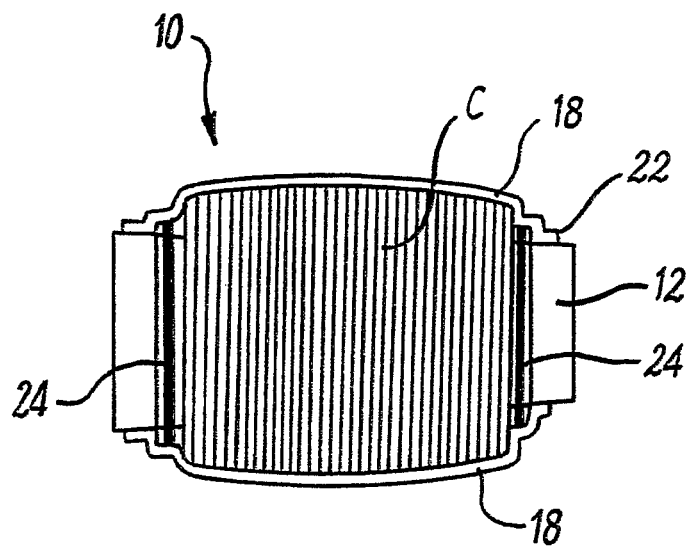
FIG. 5 shows the tool with the structure materiel applied thereto and sealed beneath an enclosure means.

FIGS. 3 to 5 show three steps in the process of the manufacture of a composite structure C on a tool 10 according to the present invention.

Figure 6:
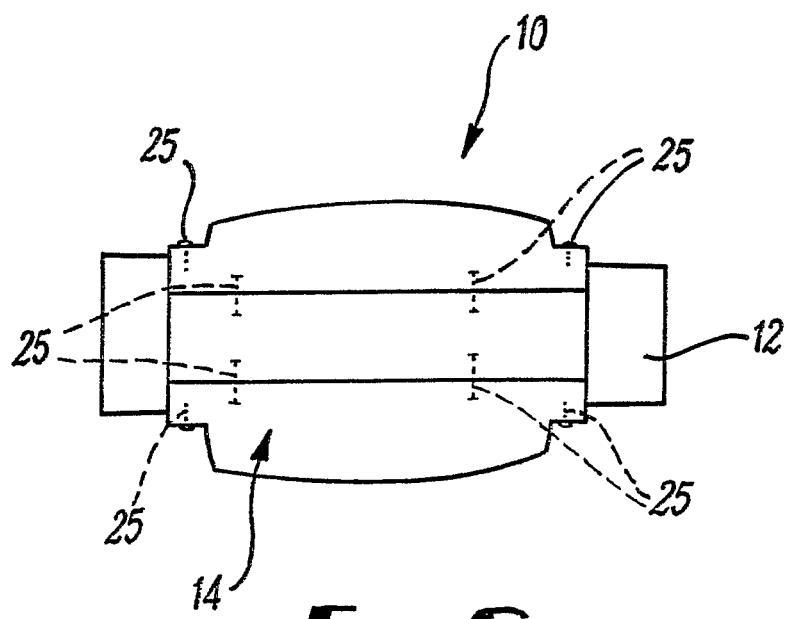
FIG. 6 shows the tool of FIG. 2 with alternative means to retain the tool sections in position.

The tool 10 is assembled by locating the tool sections 14 around the support section 12. Straps 24, or other suitable means (25—FIG. 6) may be used to help retain the tool sections 14 in place around the core section 12, where necessary.

The tool 10, is mounted upon means to enable rotation thereof, illustrated generally as a rotating shaft 26. Of course other suitable and conventional means for rotating such structures can be employed.

Particularly where the structures are large and complex such as aeroplane fuselages, the composite structure material is generally wound around and on to the tool surfaces. The precision that is often required, means that the composite material is often placed by a robotic head 28.

Once the composite material is engaged on the tool surface, shown at one end thereof in see FIG. 3, the tool 10 is carefully rotated, and the robotic head 28 gradually moved along the axis of rotation of the tool 10, to wind the composite material around the tool surface 16.

FIG. 4 shows material C wound along part of the length of the tool surface 16.

FIG. 5 shows the material C wound along the entire length of the tool surface 16, at which point the robotic head 28 is disengaged.

The enclosure means, or vacuum bag 18, is then located over the composite material C and the tool sections 14 therebeneath and sealingly engaged on the outer surface 22 of the support section 12. Adhesive tapes and other conventional means to securing vacuum bags around composite materials can be employed.

The provision of a vacuum integral enclosure of the composite material between the support section 12 and the enclosure means 18 provides considerable advantage over the prior art, particularly in the manufacture of large and complex articles such as aeroplane fuselages.

The composite material can then be subjected to cure conditions such as elevated temperature and non-ambient pressure conditions, such as vacuum conditions, according to conventional techniques.

Once the structure material has been cured to the desired condition, the enclosure means 18 can be removed and the core section 12 can be slidingly retracted from therewithin allowing the tool sections 14 to be selectively collapsed inwardly thereby releasing the composite structure C from the tool.

Figure 7:
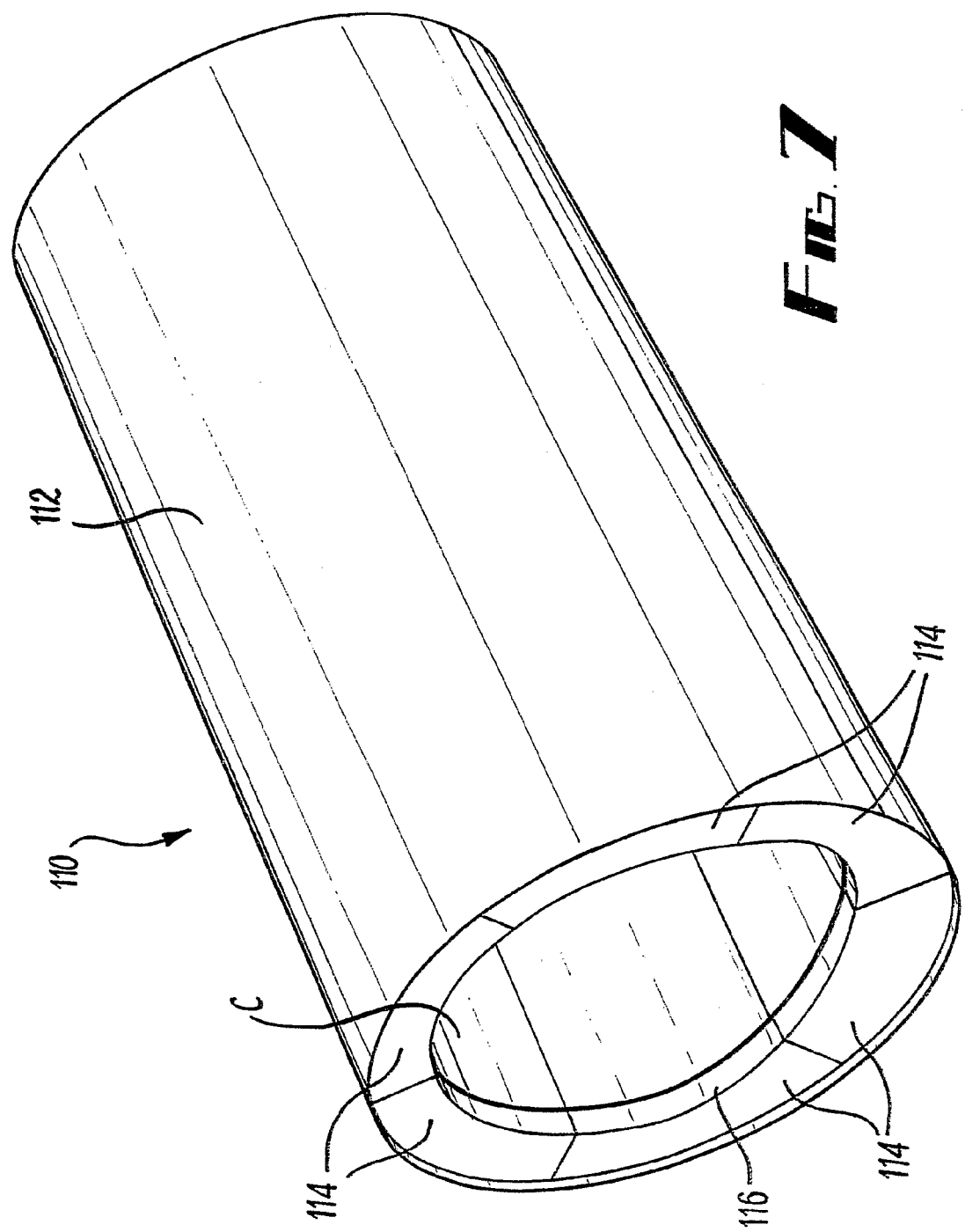
FIG. 7 is a perspective illustration of a tool according to a further embodiment of the present invention.
Figure 8:
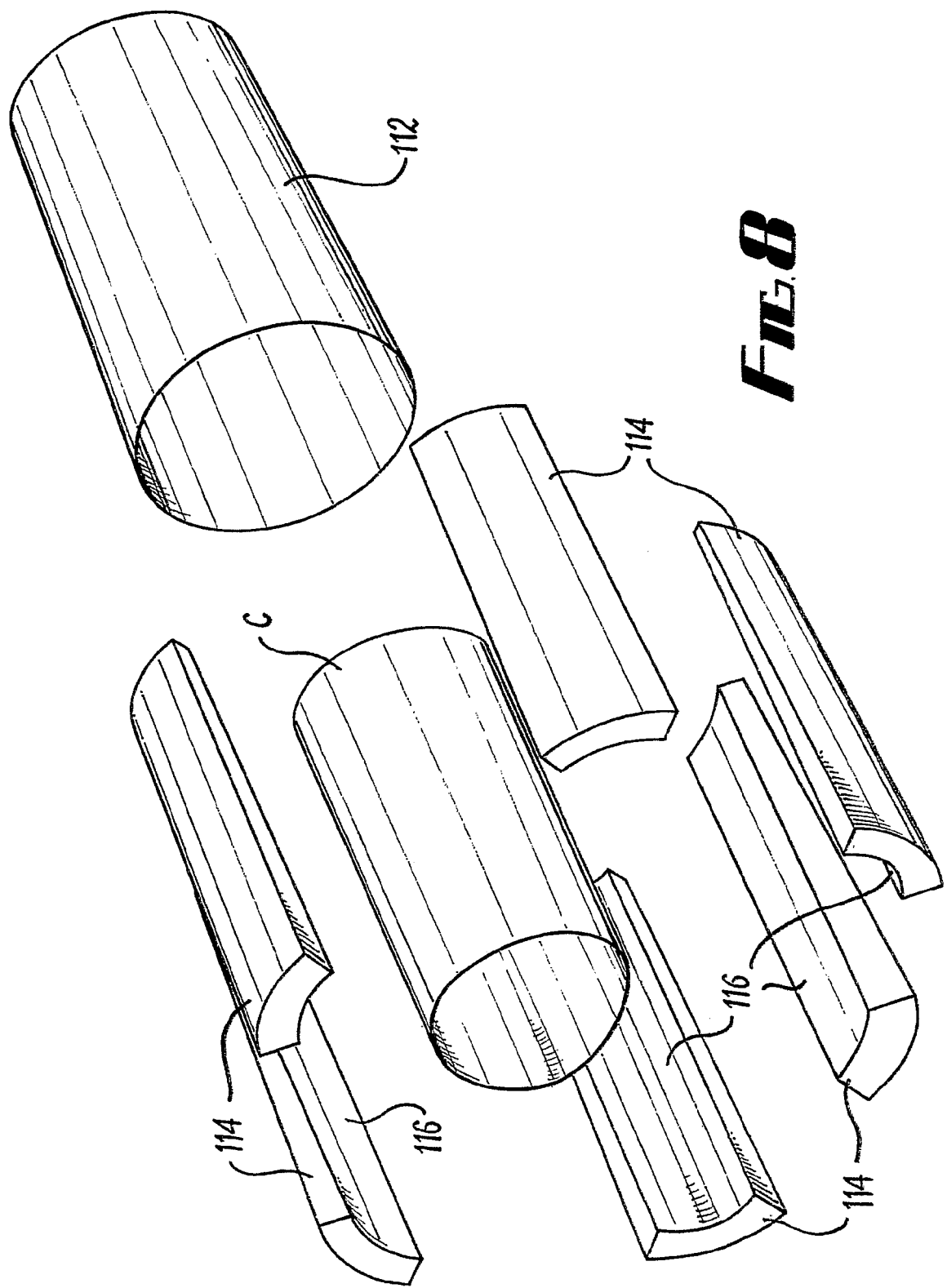
FIG. 8 is a diagrammatic exploded view of the tool of FIG. 7.
Figure 9:
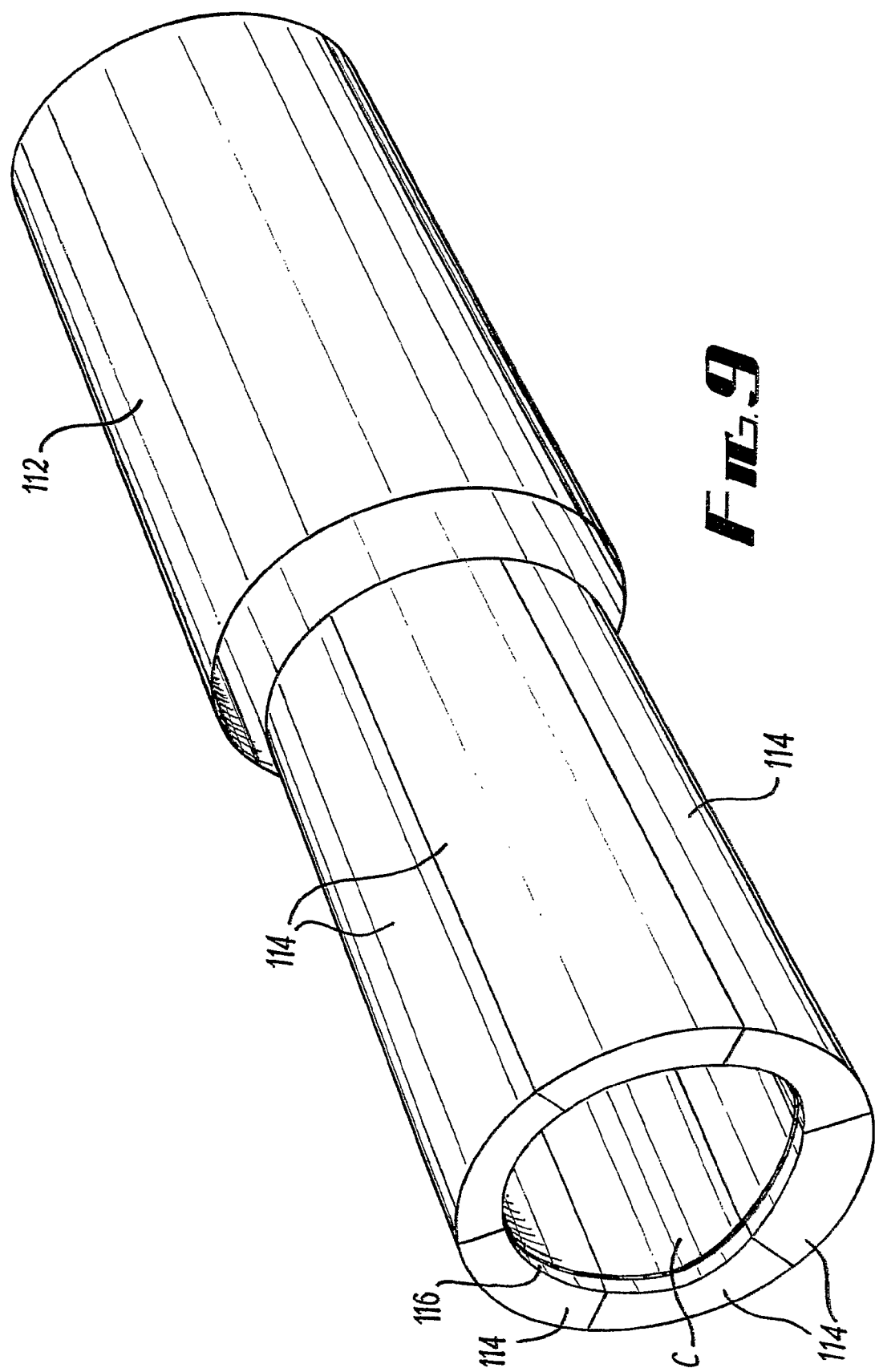
FIG. 9 is a further diagrammatic illustration of the tool of FIG. 7 with the tool sections and structure material thereon slidingly displaced from within the support structure.

FIGS. 7 to 9 illustrate a tool 110 according a further embodiment of the present invention, the tool 110 comprising a support section 112, tool sections 114 locatable around the inside of the support section 112 to define one or more tool surfaces 116 on which structure material C is locatable to be moulded, the support section 12 and the enclosure means 118 being sealingly engagable to enclose the tool sections 114 and structure material C therebetween.

In more detail, tool 110 can be described as a female tool in that it provides for the moulding of material C internally of the tool 110.

The support section 112 is illustrated as a cylindrical, unitary body that is desirably manufactured of composite material and most desirably composites of the same or of similar characteristics to the material from which the tool sections 114 and the structure material C are comprised. The support section 112 may be tapered along its length, but could comprise parallel sides which would still enable selective retraction of the tool section from therewithin (as illustrated in FIG. 9).

The tool sections 114 are locatable in series around the internal diameter of the support section 112 such that the consecutive tool sections 114 abut one another and between them define the tool surface 116 on the inside of the tool on which the composite material C can be located and moulded.

The tool sections 114 are configured so as not to be inwardly collapsible. The angles of the side of the sections 114 are such as to prevent inward collapse. In this particular embodiment there is no requirement for the tool sections 114 to be internally collapsible as they would be removed in an outward direction to release a structure moulded thereon, from the tool 110. The outer support section 112 will act to retain the tool sections 114 in location together when the tool sections 114 are located within the support section 112. However, retaining means such as traps or the like (not shown) may be provided when it is desired to displace the tool sections 114 from within the support section 112, for example during application of the composite material to the tool surfaces 116.

To locate material C internally within the tool 112 any suitable conventional technique can be used, such as laying by hand, and the material cured again according to known techniques.

In this embodiment the enclosure means 118 would extend internally over the material C to sealingly engage on the support section 112. In the embodiment as illustrated, the enclosure means 118 would generally engage on the outer surface of the support section 112. However, in alternative embodiments, for example where the length of the support section 112 is sufficiently greater than the length of the tool sections, the enclosure means can sealingly engage around the inside of the support section 112 and/or possibly the end surface(s) of the support sections.

Various modifications may be made within the scope of the present invention.

Means to retain the tool sections in place may be in a form other than straps 24 as described above (either instead of or in addition to the provision of one or more straps). For example the retaining means could be in the form of a threaded fastener such as a bolt 25 or other clamping means located between sections to retain adjacent tool sections together and/or extending through the tool section into the support section (see FIG. 6). In the latter case, it is preferable that the retaining means extends through the tool sections at locations remote from the tool surface and into the support section to a depth sufficient to secure, but not to extend through the support section to detrimentally affect vacuum integrity. The tool sections could be retained in position by the application of pressure or vacuum conditions between the tool sections and the support section.

The tool can be used in the moulding of composite materials according to techniques other than moulding techniques as described above. For example composite structure material may be laid in sheets or strips, such as prepregs, either by hand or by mechanised methods, or otherwise moulded according to methodology known to those skilled in the art. The composite may be wound by techniques other than robotically, for example manually.

The main embodiments described above illustrate male and female tools. It is within the scope of the present invention to provide a tool that provides for both male and female moulding. For example, the end surfaces of the support section 12 may provide for the sealing of both an internal and an external engagement means 18, with the support section 12 providing for both internal and external tool sections to be located thereagainst and supported thereby.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A tool for use in the manufacture of composite structures, the tool comprising:
   a core support section having an elongated body with a tapered configuration from one end to the other end,
   a plurality of tool sections surrounding the core support section to define a tool surface on which a composite material to be moulded is placed and formed, the core support section being selectively retractable from the tool sections, and
   a flexible, substantially non-permeable membrane sealed to portions of the core support section so as to define an airtight enclosure surrounding the tool sections and the composite material,
   wherein
   the tool sections are abutting one another and are in direct contact with an external surface of the core support section,
   the core support section is slidingly retractable from the tool sections, and
   the tool sections are self-supporting when the core support section is removed from supporting the tool sections.

2. A tool as claimed in claim 1, further comprising straps or bands around the tool sections to retain the tool sections in position on the support section.

3. A tool as claimed in claim 1, in which the tool sections are retained in position on the core support section by vacuum or partial vacuum conditions applied between the tool sections and the core support section.

4. A tool as claimed in claim 1, wherein the flexible, substantially nonpermeable membrane is a membrane or sheath of elastomeric or other plastic material.

5. A tool as claimed in claim 1, wherein the flexible, substantially nonpermeable membrane is sealed to the core support section by a sealant or an adhesive tape.

6. A tool as claimed in claim 1, wherein the tool sections comprise fibre reinforced composite materials.

7. A tool as claimed in claim 1, wherein the support section comprises fibrereinforced composite material.

\* \* \* \* \*